(12) United States Patent
Bourgois et al.

(10) Patent No.: US 7,566,486 B2
(45) Date of Patent: Jul. 28, 2009

(54) BRAID REINFORCED FLEXIBLE HOSE

(75) Inventors: Luc Bourgois, Desselgem (BE); Paul Dambre, Kemmel (BE); Dirk Meersschaut, Ooigem (BE); Luc Ravelingien, Aalter (BE)

(73) Assignee: NV Bekaert SA, Zwevegem (BE)

( * ) Notice: Subject to any disclaimer, the term of this patent is extended or adjusted under 35 U.S.C. 154(b) by 146 days.

(21) Appl. No.: 10/296,052

(22) PCT Filed: May 4, 2001

(86) PCT No.: PCT/EP01/05021

§ 371 (c)(1),
(2), (4) Date: Nov. 21, 2002

(87) PCT Pub. No.: WO01/92771

PCT Pub. Date: Dec. 6, 2001

(65) Prior Publication Data

US 2003/0129336 A1    Jul. 10, 2003

(30) Foreign Application Priority Data

May 31, 2000    (EP) .................................. 00201943

(51) Int. Cl.
*F16L 11/04*    (2006.01)
(52) U.S. Cl. ................... 428/36.9; 428/35.7; 428/35.8; 428/36.3; 428/36.8; 428/36.91; 138/123; 138/125; 138/127

(58) Field of Classification Search ................ 428/34.1, 428/35.7, 35.8, 36.3, 36.8, 36.9, 36.91; 138/118, 138/123, 124–127
See application file for complete search history.

(56) References Cited

U.S. PATENT DOCUMENTS

| 3,599,677 | A | * | 8/1971 | O'Brien ...................... 138/122 |
| 3,670,774 | A | * | 6/1972 | Bahr et al. ................... 138/178 |
| 3,726,321 | A | | 4/1973 | Clifton et al. |
| 3,740,958 | A | * | 6/1973 | Cadwell ...................... 405/166 |
| 3,817,288 | A | * | 6/1974 | Ball ........................... 138/125 |
| 3,868,974 | A | | 3/1975 | Ball |
| 4,153,079 | A | * | 5/1979 | Ambrose ..................... 138/104 |
| 4,275,937 | A | * | 6/1981 | Belofsky ..................... 138/127 |
| 4,384,595 | A | * | 5/1983 | Washkewicz et al. ........ 138/127 |
| 5,545,208 | A | * | 8/1996 | Wolff et al. ................. 623/1.22 |
| 5,956,935 | A | | 9/1999 | Katayama et al. |

FOREIGN PATENT DOCUMENTS

| EP | 0 153 544 | 9/1985 |
| EP | 0 370 134 | 5/1990 |
| FR | 2 576 040 | 7/1986 |
| GB | 863 837 | 3/1961 |
| WO | WO 99/20682 A1 | 4/1999 |

* cited by examiner

*Primary Examiner*—Rena L Dye
*Assistant Examiner*—Walter B Aughenbaugh
(74) *Attorney, Agent, or Firm*—Foley & Lardner LLP

(57) ABSTRACT

A braided hose reinforcement includes left and right turning strips. Each of the strips includes a number of elongated metal elements embedded in a matrix of a polymer material.

16 Claims, 1 Drawing Sheet

BRAID REINFORCED FLEXIBLE HOSE

FIELD OF THE INVENTION

The invention relates to a braided hose reinforcement.

BACKGROUND OF THE INVENTION

Hoses, for example hydraulic and pneumatic hoses, conventionally comprise a flexible inner tube, such as a rubber or plastic inner tube surrounded by one or more tubular braids of metal wires.

Since these hoses are used for conveying high pressure fluids or gases, they have to withstand the forces of the pressure within the hose. In order to obtain a high impulse strength, high strength carbon steel wires are utilized as reinforcing elements.

In a still continuing effort to save weight of a hose reinforcement and to increase the flexibility, there is a trend to use wires with a higher tensile strength.

However, because of the high internal pressure, high transversal stresses are applied on the reinforcing elements. This has as consequence that the hose can not be utilized at its full strength.

To minimize the stresses on the wires, the strips can be braided in such a way that the braided structure does not provide 100% coverage of the inner tube but for example only 80 or 85% coverage. The separation between adjacent strips permits some freedom of movement of the wires during flexing and/or application of fluid pressure to the hose and results in good stress transfer from wire to wire.

Other ways to minimize the stresses applied on the wires is to provide a hose reinforcement which comprises several superimposed layers of wires. Such reinforcement structures, however, have the disadvantage of a higher weight.

SUMMARY OF THE INVENTION

It is an object of the present invention to provide a braided hose reinforcement with an increased strength and endurance.

It is also an object of the invention to decrease the weight and to increase the flexibility of a hose reinforcement while maintaining a high strength.

According to a first aspect of the invention, a braided hose reinforcement is provided. The hose reinforcement comprises a number of left and right turning strips. The left turning strips are bent in such a way that they subsequently run above and under the right turning strips; while the right turning strips are bent so that they subsequently run above and under the left turning strips.

Each of the strips comprises a number of elongated metal elements embedded in a matrix of a polymer material.

The metal elements are preferably located parallel in the plane of the strip.

The metal elements are preferably high carbon steel wires, but can also be stainless steel wires, steel bundles or steel cords.

Conventionally, a hose reinforcement comprises braided strands of metal wires.

Since each strand passes alternately over and under a transversely directed strand, the wires of the strands are deformed.

Consequently, stresses are created on the wires, more particularly on the segments of the wires between adjacent overlying and underlying transverse strips.

The stresses created in each segment will depend on the level of pinching exerted by the wires lying over and under the wire.

This pinching gives rise to a rather complex form of stress, which is not simply tensile or traction, but is also including transversal forces on certain points along the wires. The wires located at the outer side of a strand suffer most from this pinching effect.

It has been shown that transversal forces have a negative impact on the breaking load of a metal wire.

Consequently, due to the pinching effect, creating transversal contact stresses, the high tensile wire can not be used at its full potential.

This means that the full strength of the hose remains limited although high tensile wire is used.

Therefore, according to the present invention, the metal wires are embedded in a polymer matrix.

By embedding the metal wires in a polymer matrix the pinching effect is reduced. Consequently, the loss in breaking load is reduced or even avoided.

A strip comprises preferably between two and ten steel wires, more preferably a strip comprises between four and eight wires.

The strips have a width preferably between 3 and 25 mm and a thickness preferably between 0.2 and 5 mm.

The steel wires preferably have a diameter between 0.10 and 0.90 mm, for example 0.20 mm.

The wires may be round wires or they may be flattened, for example to wires having a rectangular cross-section or a rectangular cross-section with rounded edges.

The steel wires embedded in the strips preferably have a carbon content between 0.70% and 1.20% and a tensile strength between 2150 and 4000 N/mm$^2$.

A possible method of manufacturing a strip is by coextrusion.

As polymer material any elastomeric material, such as rubber or any thermoplastic material can be used.

With a thermoplastic material is meant any thermoplast and any thermoplastic elastomer.

Examples of suitable thermoplastic materials are: polyethylene (PE), polypropylene (PP), polystyrene (PS), polyethylene terephthalate (PET), polyethylene napthalate (PEN), polybuteen terephthalate (PBT) polyvinylchloride (PVC), polyester, polyamide (PA), polyimide (PI), polycarbonate (PC), styrene acrilonitryl (SAN), acrylonitril-butadiene-styrene (ABS), thermoplastic polyurethane (TPU), thermoplastic polyolefins (TPO), thermoplastic copolyetheresters, copolymers of these polymers or similar materials.

In order to assure a good adhesion between the metal and the polymer material, an adhesion promoter can be applied on the metal elements. Possible adhesion promoters are bifunctional coupling agents such as silane compounds. One functional group of these coupling agents is responsible for the binding with the metal or metal oxides; the other functional group reacts with the polymer.

More details about these coupling agents can be found in the PCT application WO 99/20682.

Other suitable adhesion promoters are aluminates, zirconates or titanates.

The steel wires may also be coated with a metal or metal alloy coating to assure satisfactory adhesion to the polymer material.

Suitable coatings are for example copper or zinc or alloys of these metals, such as brass.

The braided hose reinforcement may comprise steel wires arranged in one layer or may comprise multiple layers.

In case the hose reinforcement comprises more layers, a thin polymer layer may be present between two different layers to provide stress transfer from one layer to the other.

According to a second aspect of the invention a hose, pipe or tube comprising a hose reinforcement as described above is provided.

According to a further aspect a method of manufacturing a hose reinforcement according to the present invention is provided.

This method comprises the steps of providing a number of strips, each of said strips comprising a number of elongated metal elements embedded in a matrix of a polymer material;

braiding said strips to form the reinforcement.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
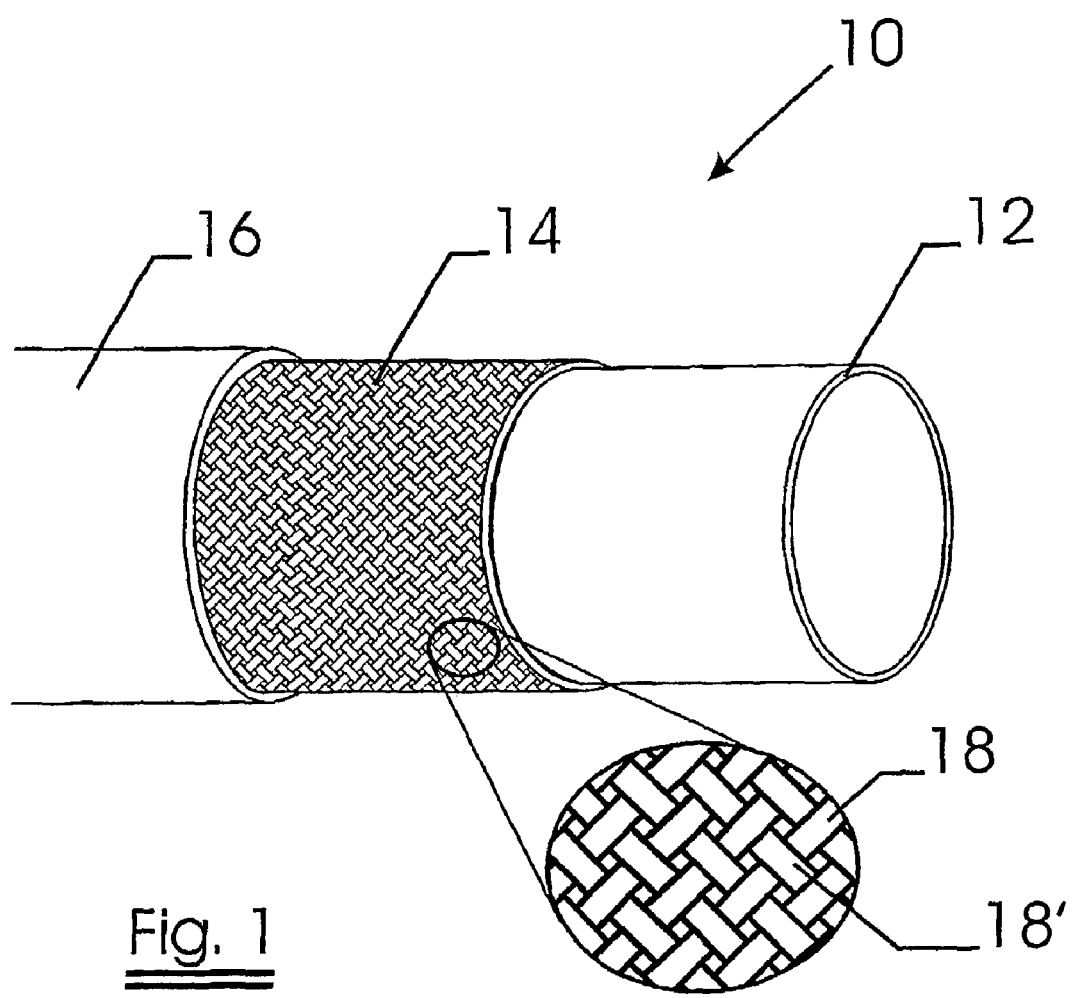
FIG. 1 shows a reinforced hose according to the present invention.

FIG. 1 shows a flexible hose 10.

The hose comprises:

an inner tube 12;

a reinforcement structure 14, comprising at least one tubular braid;

an outer cover 16.

The inner tube and the outer cover may be made of any suitable rubber or thermoplastic elastomer known to be useful in hose applications. The reinforcement 14 comprises strips 18 passing alternately over and under transversely directed strips 18'.

Figure 2:
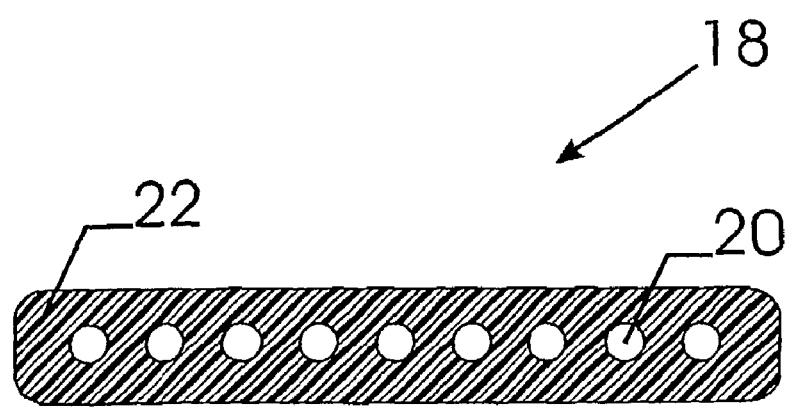
FIG. 2 is an illustration of a strip comprising elongated metal elements embedded in a matrix of a polymer material.

FIG. 2 shows a strip 18.

The width of the strip is 15 mm, the thickness is 3 mm.

A strip 18 comprises nine steel wires 20 having a diameter between 0.10 and 0.90 mm.

The steel wires are for example steel wires with a carbon content between 0.70% an 1.20% or high carbon micro-alloyed steel wires comprising from 0.70% to 1.20% C, 0.10 to 1.2% Mn and up to 0.40% of chromium, cobalt, molybdenum, nickel, and/or vanadium.

The tensile strength of the wires is preferably higher than 2800 N/mm$^2$.

The strip comprises polyurethane (PU) as matrix material 22. This PU material is applied by extrusion.

Possibly, the steel wires located at the outer sides of a strip may be replaced by steel wires having a lower tensile strength than the steel wires located in the central part of the strip.

In a preferred embodiment the steel wires located at the outer sides of a strip have a tensile strength which is at least 10% lower than the tensile strength of the steel wires located in the central part of the strip. More preferably, the tensile strength of the steel wires located at the outer sides of a strip is more than 20% lower than the tensile strength of the steel wires located in the central part of the strip.

For example, the steel wires located at the outer sides of a strip may be stress-relieved steel wires. These steel wires preferably have an elongation at rupture exceeding 4%.

Alternatively, the steel wires located at the outer side of a strip are wires having a lower carbon content than the steel wires located in the central part of the strip.

The carbon content of the steel wires located at the outer sides of a strip is for example lower than 0.80%.

The invention claimed is:

1. A braided hose reinforcement comprising:

a plurality of strips, each strip having a boundary wherein each boundary encloses a distinct matrix of polymer material in its entirety and elongated metal elements embedded in each respective matrix of polymer material;

wherein the strips comprise left and right turning strips;

wherein the left turning strips run above and under the right turning strips, and the right turning strips run above and under the left turning strips.

2. A braided hose reinforcement according to claim 1, wherein said left and right turning strips have a width ranging from 3 to 25 mm and a thickness ranging from 0.2 to 5 mm.

3. A braided hose reinforcement according to claim 1, wherein said elongated metal elements are steel wires, steel bundles or steel cords.

4. A braided hose reinforcement according to claim 3, wherein said steel wires are round or flat steel wires.

5. A braided hose reinforcement according to claim 3, wherein said elongated metal elements are steel wires with a tensile strength higher than 2150 N/mm$^2$.

6. A braided hose reinforcement according to claim 1, wherein each respective matrix of polymer material comprises a number of elongated metal elements ranging between 2 and 10.

7. A braided hose reinforcement according to claim 1, wherein said polymer material is an elastomeric or thermoplastic material.

8. A hose, pipe or tube, comprising:

a braided reinforcement comprising:

a plurality of strips. each strip having a boundary wherein each boundary encloses a distinct matrix of polymer material in its entirety and elongated metal elements embedded in each respective matrix of polymer material;

wherein the strips comprise left and right turning strips;

wherein the left turning strips run above and under the right turning strips, and the right turning strips run above and under the left turning strips; wherein the hose, pipe or tube is configured to convey a high pressure fluid or gas.

9. A method of manufacturing a hose reinforcement, said method comprises the steps of providing a number of strips, each of said strips comprising a number of elongated metal elements embedded in a matrix of a polymer material;

braiding said strips to form the reinforcement of claim 1.

10. A braided hose reinforcement according to claim 1, wherein the elongated metal elements are embedded in the matrix of polymer material such that the matrix of polymer material surrounds the elongated metal elements.

11. A hose, pipe or tube according to claim 8, further comprising an inner tube;

wherein the reinforcement is disposed on the exterior of the inner tube.

12. A braided hose reinforcement according to claim 1, wherein the plurality of elongated metal elements are arranged within each distinct matrix so that the elongated metal elements lie in the same plane.

13. A reinforcement comprising:
- a braided hose, wherein the braided hose includes:
  - a plurality of strips, each strip having a boundary wherein each boundary encloses a distinct matrix of polymer material in its entirety and a plurality of elongated metal elements embedded in each respective matrix of polymer material;
  - wherein the strips comprise left and right turning strips;
  - wherein the left turning strips run above and under the right turning strips, and the right turning strips run above and under the left turning strips.

14. A reinforcement according to claim 13, wherein the elongated metal elements at outer sides of the strips have a lower tensile strength than an elongated metal element in a central part of the strips.

15. A braided hose reinforcement according to claim 1, wherein the elongated metal elements at outer sides of the strips have a lower tensile strength than an elongated metal element in a central part of the strips.

16. A hose, pipe or tube according to claim 8, wherein the elongated metal elements at outer sides of the strips have a lower tensile strength than an elongated metal element in a central part of the strips.

* * * * *